United States Patent
Muldoon et al.

(10) Patent No.: US 12,060,839 B1
(45) Date of Patent: Aug. 13, 2024

(54) OPTIMIZED BOWED ROTOR CONTROL METHOD

(71) Applicant: RTX Corporation, Farmington, CT (US)

(72) Inventors: Marc J. Muldoon, Marlborough, CT (US); Bradley C. Schafer, Ellington, CT (US); John P. Virtue, Jr., Middletown, CT (US); Brian V. Winebrenner, Vernon, CT (US); Jason B. Solomonides, Cromwell, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/299,431

(22) Filed: Apr. 12, 2023

(51) Int. Cl.
  *F02C 9/00* (2006.01)
  *F01D 21/06* (2006.01)
  *F01D 25/36* (2006.01)

(52) U.S. Cl.
  CPC ............... *F02C 9/00* (2013.01); *F01D 21/06* (2013.01); *F01D 25/36* (2013.01)

(58) Field of Classification Search
  CPC ............. F02C 9/00; F01D 21/06; F01D 25/36
  USPC ............................................................. 415/1
  See application file for complete search history.

(56) References Cited

U.S. PATENT DOCUMENTS

| | | | |
|---|---|---|---|
| 9,664,070 B1* | 5/2017 | Clauson | F02C 7/277 |
| 10,539,079 B2 | 1/2020 | Schwarz et al. | |
| 2018/0149086 A1 | 5/2018 | Moniz | |
| 2018/0202315 A1* | 7/2018 | Coldwate | H02K 11/25 |
| 2018/0340475 A1* | 11/2018 | Grigorov | F01D 19/02 |
| 2019/0203646 A1* | 7/2019 | Cannella | F03G 1/00 |
| 2022/0154595 A1* | 5/2022 | Knecht | F01D 25/36 |
| 2022/0307425 A1 | 9/2022 | Boecke et al. | |

* cited by examiner

*Primary Examiner* — J. Todd Newton
(74) *Attorney, Agent, or Firm* — CANTOR COLBURN LLP

(57) ABSTRACT

A bowed rotor prevention system includes a gas turbine engine, an electric motor, and a core turning controller in signal communication with the electric motor. The gas turbine engine includes a rotor that is rotatably coupled to a drive shaft. The electric motor rotatably is coupled to a motor shaft, which is mechanically coupled to the drive shaft so as to rotate therewith. The core turning controller is configured to invoke an anti-rotor bowing mode, and to control the electric motor to periodically rotate the rotor into a plurality of rotor positions during a given time period in response to invoking the anti-rotor bowing mode.

18 Claims, 4 Drawing Sheets

OPTIMIZED BOWED ROTOR CONTROL METHOD

BACKGROUND

This disclosure relates generally to gas turbine engines, and more particularly, to a system and method for mitigating rotor and case bow in a gas turbine engine.

When turbine engines are shut down after operation, the retained heat in the core rises and creates a bow in the turbine rotor and engine case. The bowing phenomenon is referred to as "rotor bowing" or "thermal bowing." If the engine is restarted before it has thermally stabilized and the rotor bowing is not removed, the bowed rotor(s) can rub against the static seals. As a result, the seal material can be worn down or entirely removed, which can compromise compressor stability. In a worst-case scenario, the rotor can rub sufficiently deep into the static seal and cause an engine stall.

BRIEF DESCRIPTION

According to a non-limiting embodiment, a bowed rotor prevention system includes a gas turbine engine, an electric motor, and a core turning controller in signal communication with the electric motor. The gas turbine engine includes a rotor that is rotatably coupled to a drive shaft. The electric motor rotatably is coupled to a motor shaft, which is mechanically coupled to the drive shaft so as to rotate therewith. The core turning controller is configured to invoke an anti-rotor bowing mode, and to control the electric motor to periodically rotate the rotor into a plurality of rotor positions during a given time period in response to invoking the anti-rotor bowing mode.

In addition to one or more of the features described above, or as an alternative to any of the foregoing embodiments, at least one rotation sensor configured to sense rotation of the rotor and output a rotational signal indicating one or both of a rotational rotor speed of the at least one rotor and a rotor position of the rotor, wherein the core turning controller utilizes the rotational signal to determine one or both of at least one previous rotor position of the rotor during the given time period and a current rotor position of the rotor during the given time period.

In addition to one or more of the features described above, or as an alternative to any of the foregoing embodiments, the core turning controller compares the current rotor position to the at least one previous rotor position, and determines at least one new rotor position based on the comparison.

In addition to one or more of the features described above, or as an alternative to any of the foregoing embodiments, the core turning controller adjusts the rotor from the current rotor position to the at least new rotor position in response to the current rotor position matching the at least one previous rotor position.

In addition to one or more of the features described above, or as an alternative to any of the foregoing embodiments, the core turning controller pre-determines the plurality of rotor positions based on the given time period.

In addition to one or more of the features described above, or as an alternative to any of the foregoing embodiments, the core turning controller determines the given time period based on a previous operating time of the gas turbine engine.

In addition to one or more of the features described above, or as an alternative to any of the foregoing embodiments, the previous operating time is a most recent completed flight of an aircraft implementing the gas turbine engine.

In addition to one or more of the features described above, or as an alternative to any of the foregoing embodiments, the core turning controller determines a thermal temperature of the rotor and controls the electric motor to periodically rotate the rotor into a plurality of rotor positions during the given time period based on the thermal temperature.

In addition to one or more of the features described above, or as an alternative to any of the foregoing embodiments, the core turning controller determines one or both of the plurality of rotor positions and the given time period based on the thermal temperature.

According to another non-limiting embodiment, a method of removing and/or preventing thermal bowing in an aircraft rotor is provided according to a non-limiting embodiment of the present disclosure. The method comprises rotating a rotor of a gas turbine engine in response to rotating a drive shaft coupled to the rotor, and driving, via an electric motor, a motor shaft that is coupled to the drive shaft so as to rotate the drive shaft. The method further includes invoking, by a core turning controller, an anti-rotor bowing mode, and controlling the electric motor using the core turning controller to periodically rotate the rotor into a plurality of rotor positions during a given time period in response to invoking the anti-rotor bowing mode.

In addition to one or more of the features described above, or as an alternative to any of the foregoing embodiments, the method further comprises sensing rotation of the rotor using at least one rotation sensor, and outputting from the at least one sensor a rotational signal indicating one or both of a rotational rotor speed of the at least one rotor and a rotor position of the rotor Based on the rotational signal, the method includes determining by the core turning controller one or both of at least one previous rotor position of the rotor during the given time period and a current rotor position of the rotor during the given time period.

In addition to one or more of the features described above, or as an alternative to any of the foregoing embodiments, the method further comprises comparing, by the core turning controller, the current rotor position to the at least one previous rotor position, determining at least one new rotor position based on the comparison.

In addition to one or more of the features described above, or as an alternative to any of the foregoing embodiments, the method further comprises controlling the electric motor, by the core turning controller, so as to adjust the rotor from the current rotor position to the at least new rotor position in response to the current rotor position matching the at least one previous rotor position.

In addition to one or more of the features described above, or as an alternative to any of the foregoing embodiments, the method further comprises pre-determining, by the core turning controller, the plurality of rotor positions based on the given time period.

In addition to one or more of the features described above, or as an alternative to any of the foregoing embodiments, the method further comprises determining, by the core turning controller, the given time period based on a previous operating time of the gas turbine engine.

In addition to one or more of the features described above, or as an alternative to any of the foregoing embodiments, the previous operating time is a most recent completed flight of an aircraft implementing the gas turbine engine.

In addition to one or more of the features described above, or as an alternative to any of the foregoing embodiments, the method further comprises determining, by the core turning controller, a thermal temperature of the rotor; and controlling the electric motor to periodically rotate the rotor into a plurality of rotor positions during the given time period based on the thermal temperature.

In addition to one or more of the features described above, or as an alternative to any of the foregoing embodiments, the method further comprises determining, by the core turning controller, one or both of the plurality of rotor positions and the given time period based on the thermal temperature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Known turbine rotor and engine case bow mitigation techniques involve rotating the rotor prior to starting for a minute up to several minutes in order to remove most of the bow. However, this pre-start rotation operation (sometimes referred to as "motoring") adds time to the overall aircraft starting process, which delays flight times and impacts customer operating logistics. Known pre-start rotation techniques also do not actively control and manage the rotation of the rotor in a manner that achieves optimal rotational angles to ensure the removal of a bowed rotor in the quickest time possible.

One or more non-limiting embodiments of the present disclosure provides a bowed rotor prevention system configured to optimally remove, or even fully prevent, rotor bow that can occur in a gas turbine engine. The bowed rotor prevention system implements one or more rotation sensors that can inform an engine control system of the current rotation and/or position of the rotor. In one or more embodiments, the bowed rotor prevention system utilizes the gear rotation data to set the rotor position at defined locations at set intervals (e.g., rotating the rotor 120 degrees every 5 minutes or 180 degrees every 10 minutes) rather than continually rotating the rotor over random and non-discretionary positions or time intervals. In this manner, the bowed rotor prevention system according to various embodiments of the present disclosure can minimize energy use, while removing, or even preventing, bowed rotors that can occur in a gas turbine engine.

In one or more non-limiting embodiments, a bowed rotor control method is tailored to rotor bow conditions such as ambient temperature, thrust reverser deployment, engine temperature, and/or other parameters that affect rotor bow. In addition to energy conservation adjusting the rotational position of the rotor at targeted intervals (rather than continuously without stoppage) can prevent an excessive bow in a targeted direction. Having the bowed rotor prevention system rotate the rotor to targeted positions over a given time interval rather than constantly rotating the rotor over full rotations during a given time interval prevents the rotor from inadvertently stopping in a similar location two or more times and allowing a bow to form.

Figure 1:
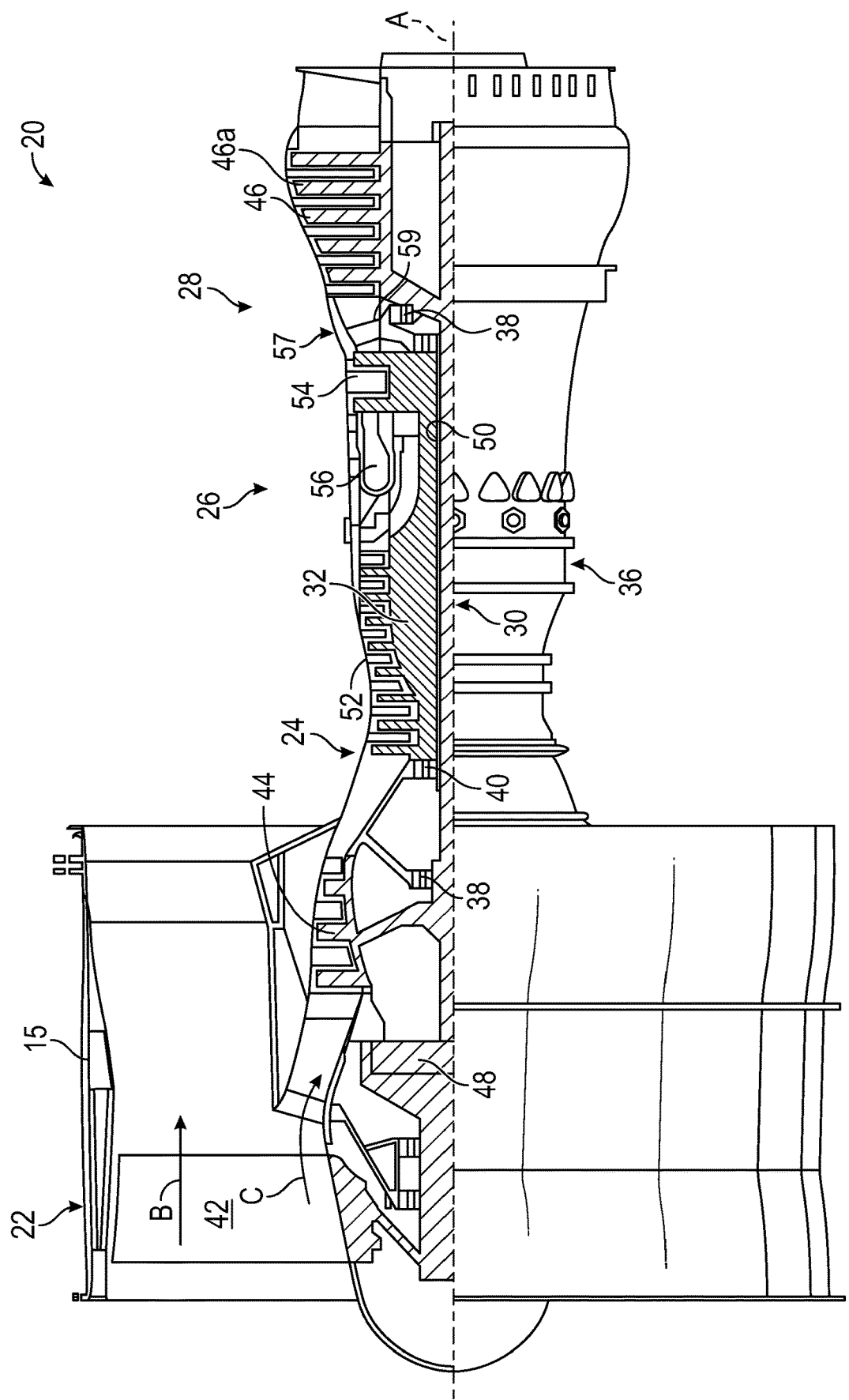
FIG. 1 is a schematic, partial cross-sectional view of a gas turbine engine in accordance with this disclosure.

With reference now to FIG. 1, a gas turbine engine 20 is schematically illustrated according to a non-limiting embodiment of the present disclosure. The gas turbine engine 20 is disclosed herein as a two-spool turbofan (e.g., an air turbine assembly) that generally incorporates a fan section 22, a compressor section 24, a combustor section 26 and a turbine section 28. Alternative engines might include other systems or features. In one or more non-limiting embodiments, the gas turbine engine 20 is implemented as a turbo-generator or motor-generator such that the gas turbine engine 20 is coupled with an electrically powered motor-generator. In one or more non-limiting embodiments, the turbo-generator is implemented as a gas turbine engine 20 which couples the turbo-generator to a spool (e.g., high speed spool, low speed spool, etc.). In some examples, the turbo-generator may include two or more motor generators, each motor-generator connected to a different spool (e.g., a first motor-generator coupled to a high speed spool and a second motor-generator coupled to a low speed spool.

The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally implements a spool assembly, which includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 (e.g., geared architecture) may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

In one non-limiting example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
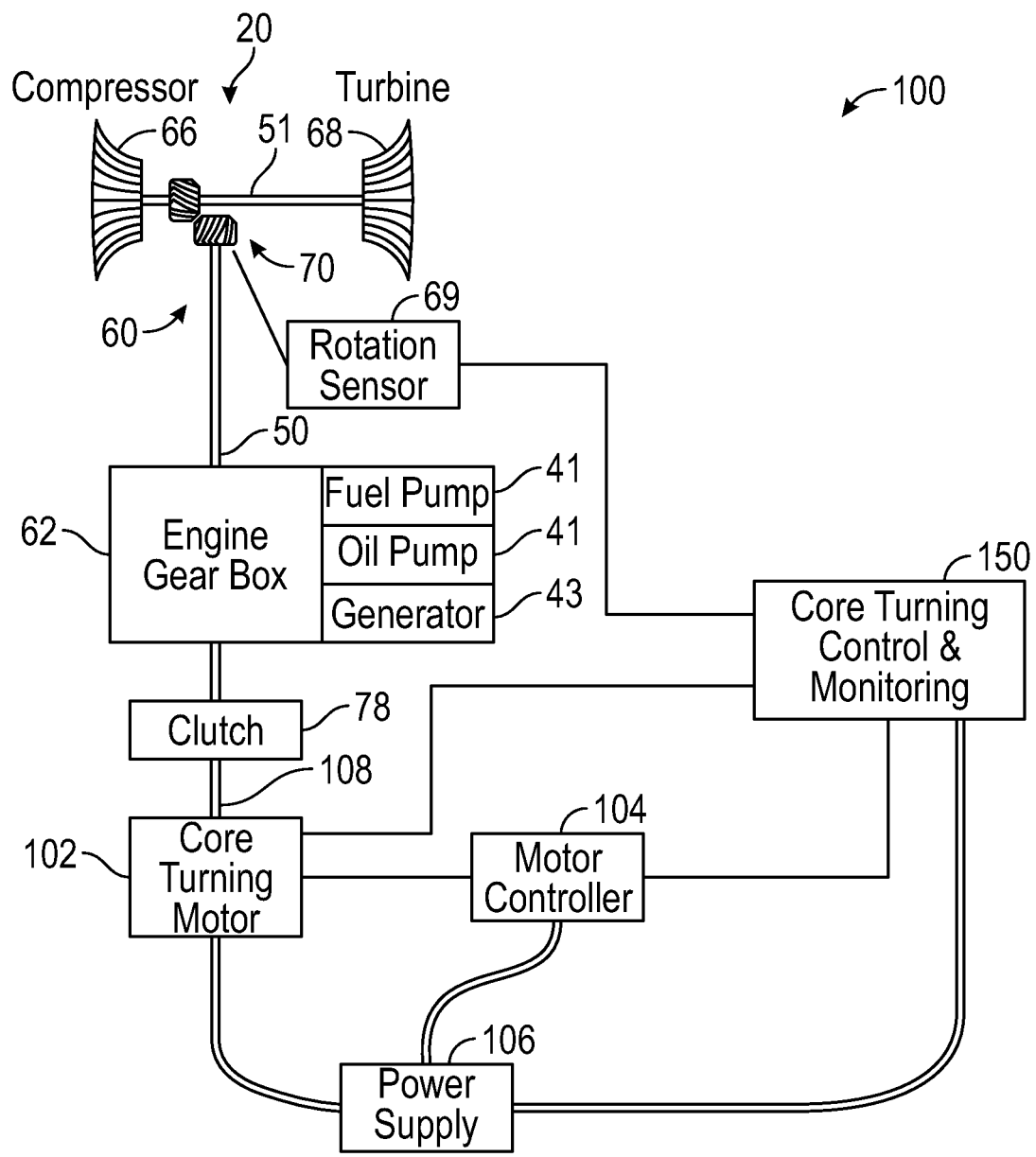
FIG. 2 is a diagram depicting a bowed rotor prevention system according to a non-limiting embodiment of the present disclosure.

Turning now to FIG. 2, a block diagram of the bowed rotor prevention system 100 according to an embodiment. In the example of FIG. 2, the bowed rotor prevention system 100 is configured to reduce, or even prevent, turbine rotor bow and/or engine case bow from occurring in a gas turbine engine 20. According to a non-limiting embodiment, the gas turbine engine 20 includes an air compressor 66 coupled to a turbine 68 via a spool shaft 51. The bowed rotor prevention system 100 includes a core turning motor 102, a controller 104, and a power supply 106. The core turning motor 102 is mechanically coupled to the gas turbine engine 20. In one or more non-limiting embodiments, the gas turbine engine 20 is mechanically coupled to the core turning motor via an air turbine starter assembly 60.

The core turning motor 102 is an electric motor that drives a motor shaft 108 responsive to an electric current from the power supply 106. In an embodiment, the core turning motor 102 (also referred to as bowed rotor prevention motor 102) is incapable of driving rotation of the gas turbine engine 20 of FIG. 1 at a sufficient speed to start combustion within the gas turbine 20. In an embodiment, the bowed rotor prevention motor 102 drives rotation of the gas turbine engine 20 at less than 1000 RPM and may be incapable of producing sufficient horsepower to reach higher speeds when driving engine rotation. The controller 104 is operable to control a flow of electric current from the power supply 106 to the bowed rotor prevention motor 102. The controller 104 is operable to engage the bowed rotor prevention motor 102 based on detecting an engine shutdown condition of the gas turbine engine 20 of FIG. 1.

In one or more non-limiting embodiments, controller 104 can receive an engine shutdown indicator signal from an engine control (not depicted) of the gas turbine engine 20 of FIG. 1. Alternatively, the engine shutdown indicator signal may be received from another source, such as a sensor, an aircraft communication bus, a discrete switch (e.g., switch position, throttle in off position etc.), or the like. The controller 104 can use a power supply interface to control the flow of electric current on one or more power supply lines between the power supply 106 and the bowed rotor prevention motor 102. The flow of electric current can be controlled using one or more switching elements, such as relays, (not depicted) through the power supply interface. The power supply interface may also enable the controller 104 to monitor the power supply 106 and/or back electromotive force of the bowed rotor prevention motor 102.

The controller 104 may include memory to store instructions that are executed by a processor. The executable instructions may be stored or organized in any manner and at any level of abstraction, such as in connection with a controlling and/or monitoring operation of one or more systems of the gas turbine engine 20 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The controller 104 can be embodied in an individual line-replaceable unit, within a control system (e.g., in an electronic engine control), and/or distributed between multiple electronic systems.

In the example of FIG. 2, the motor shaft 108 is mechanically linked to a gear interface 70 via one or more intervening shafts and gear assemblies. According to a non-limiting embodiment, a gear interface 70 mechanically couples an output shaft 40 (e.g., an inner shaft) to the drive shaft 50 (e.g., an outer shaft) and the spool shaft 51. In one or more non-limiting embodiments, the motor shaft 108 is coupled to the air turbine starter assembly 60 via a clutch 78. The clutch 78 facilitates selective engagement and disengagement of the bowed rotor prevention motor 102 to the gas turbine engine 20. Accordingly, the clutch 78 can be operated to invoke different operating modes including, but not limited to, an anti-rotor bowing mode, a maintenance operation mode, and an engine start operation mode.

The drive shaft 50 is coupled to an engine gear box 62 The gear interface 70 translates rotational motion of the output shaft 40 and the spool shaft 51 to the drive shaft 50. Likewise, the gear interface 70 translates rotational motion of the drive shaft 50 (e.g., in response to rotating the motor shaft 108) to the output shaft 40 and the spool shaft 51. While a specific configuration of the gear interface 70 is depicted in FIG. 2, other configurations are contemplated within the scope of embodiments.

With continued reference to FIG. 2, it should be appreciated that other control aspects related to the bowed rotor prevention system 100 can be managed by the controller 104 and/or other controllers, such as a full authority digital engine control (FADEC). For example, the controller 104 may disengage the bowed rotor prevention motor 102, e.g., disable power through the power supply interface, based on receiving a maintenance request to prevent the bowed rotor prevention motor 102 from driving rotation of the motor shaft 108 when a maintenance operation will be performed. Further control aspects can include disengaging one or more hydraulic pumps 41 (e.g., fuel pumps, oil pumps, etc.) and one or more electric generators 43 coupled to the engine gear box 62 when the bowed rotor prevention motor 102 is commanded to turn the motor shaft 108.

According to a non-limiting embedment, one or more rotational sensors 69 are configured to output a rotational signal indicating a rotational rotor speed and/or rotor position of the rotor/turbine fan (e.g., included in the air turbine assembly 66) and/or rotation of the turbine 68. In this manner, the controller 104 can determine the rotational position/speed of the rotor. In one or more embodiments, the controller 104 can utilize the rotational signal to set the rotor position at defined locations at set intervals rather than continually rotate the rotor so as to minimize energy use. In at least one embodiment, a first rotational sensor is coupled to a first gear and a second rotational sensor is coupled to a second gear. Providing two sensors on different gears allows for redundancy and ensures that rotation is confirmed even with one failed sensor.

Figure 3:
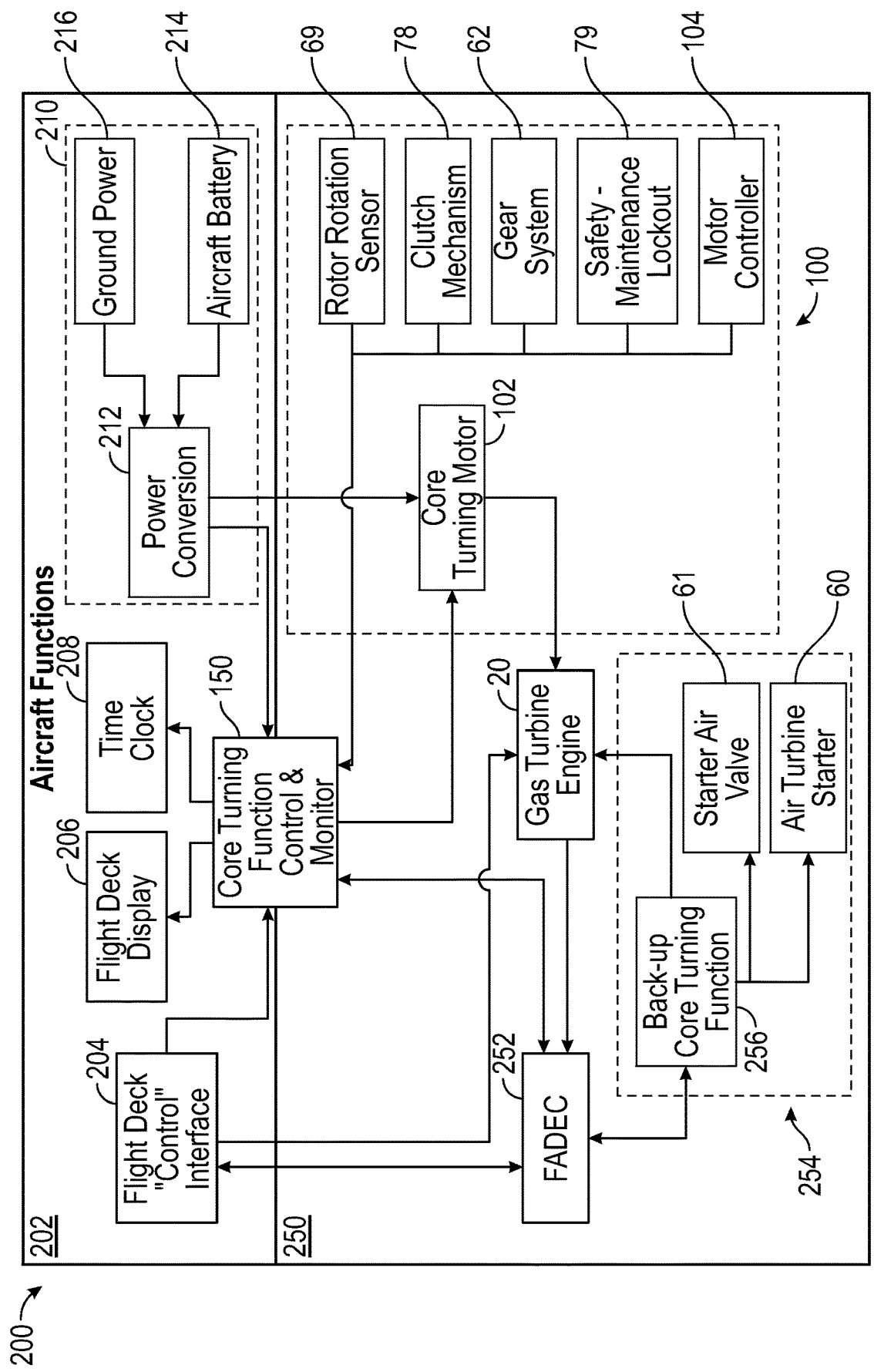
FIG. 3 is a block diagram depicting an aircraft system including a bowed rotor prevention system according to a non-limiting embodiment of the present disclosure.

Turning now to FIG. 3, a block diagram depicts an aircraft system 200 according to a non-limiting embodiment. The aircraft system 200 includes various aircraft sub-systems 202 and an engine system 250. The aircraft sub-systems 202 include a flight control interface 204, a flight deck graphical user interface (GUI) 206 (illustrated as "Flight Deck Display"), a time clock unit 208, and a power distribution system 210.

The flight deck control interface 204 and GUI 206 operate together to facilitate flight control of the aircraft. The flight control interface 204 can include various instrumentations, gauges, flight control sticks and/or pedals. The GUI 206 can display information with the gauges along with one or more radar systems. The GUI 206 also provides an interface for activating or deactivating different aircraft operating modes. The operating modes include, but are not limited to, a maintenance mode, an engine start-up mode, and an anti-rotor bowing mode.

The time clock unit 208 monitors the time duration and time intervals of aircraft operation. In one or more non-limiting embodiments, the time clock unit 208 can monitor the time during which an aircraft operating mode operates and/or the time duration during which one or more particular components are active or operate. For example, when invoking the anti-rotor bowing mode, the time clock unit 208 can monitor the time duration at which the rotor is halted in a given position before being rotated into a new position.

The power distribution system 210 provides power to the various aircraft sub-systems 202 and the engine system 100. The power distribution system 210 includes a power conversion unit 212, and a battery system 214. The power conversion unit 212 can include an aircraft generator, an AC-to-DC converter, and a DC-to-DC converter. The aircraft generator can include a turbo generator, for example, which converts mechanical power into alternating current (AC) power. The AC-to-DC converter converts AC power into direct current (DC) power. The DC-to-DC converter converts a first DC power into a second DC power, e.g., steps up (i.e., increases) an input DC voltage or steps down (decreases) an input DC voltage.

The engine system 250 includes a gas turbine engine 20, an aircraft controller 252, a bowed rotor prevention system 100, a backup rotor turning system 254, and a core turning controller 150. In one or more non-limiting embodiments, the core turning controller 150 can be implemented to provide a communication interface between the aircraft system 200 and the engine system 250.

The gas turbine engine 200 is in signal communication with one or more of the aircraft sub-systems 202. As described herein, the gas turbine engine 200 includes a rotor that is mechanically coupled to the bowed rotor prevention system 100. The gas turbine engine 20 and its arrangement with the bowed rotor prevention system 100 is described in detail above and will not be repeated for the sake of brevity.

The aircraft controller 252 can include a full authority digital engine control (FADEC), which can control various operations of the aircraft system 200 and the engine system 250. The aircraft controller 252 is in signal communication with the gas turbine engine 20, the flight deck control interface 204, the backup rotor turning system 254, and the core turning controller 150. According to a non-limiting embodiment, the aircraft controller 252 can combine throttle, prop, and mixture controls into a single control. In one more non-limiting embodiment, the FADEC can process one or more onboard models along with various measured aircraft operating parameters to actively control throttle settings at different altitudes to optimize power/prop RPM/mixture operations.

The core turning controller 150 can monitor and control operation of the bowed rotor prevention system 100. The core turning controller 150 monitors and controls the bowed rotor prevention system 100 to ensure: rotor turning is performed without any faults, e.g., core turning motor (CTM) failures; minimizes energy use to turn the rotor; and successfully removes, or completely prevents rotor bowing. Although the core turning controller 150 is illustrated as a separate controller, one or more non-limiting embodiments of the present disclosure implements the core turning controller 150 with the aircraft controller 252.

In one or more non-limiting embodiments, the core turning controller 150 can also proactively activate or deactivate the bowed rotor prevention system 100 in response to detecting activation of various aircraft operating modes. For example, the core turning controller 150 can deactivate operation of the bowed rotor prevention system 100 or prevent the bowed rotor prevention system 100 from invoking the anti-rotor bowing mode in response to receiving a request to invoke the maintenance operation mode 79 to prevent activation of the core turning motor 102 while aircraft maintenance operations are performed.

The core turning controller 150 is in signal communication with one or more of the rotation sensors 69, which output a rotor signal indicative of the rotational speed and position of the rotor. As described herein, the core turning controller 150 utilizes the data indicating the position of the rotor to set the rotor position at defined locations at set intervals during a given time period or time duration. The set intervals can include, for example, a full 360 degrees rotation during a set time duration (e.g., 15 minutes), 120 degrees of rotation every 5 minutes, 180 degrees of rotation every 10 minutes, etc., rather than continually rotating the rotor over random and non-discretionary positions or time intervals. In one or more non-limiting embodiments, a bowed rotor control system 100 utilizes rotor bowing conditions such as ambient temperature, thrust reverser deployment, engine temperature, rotor temperature, previous or more recent engine operating times and/or other parameters that affect rotor bowing to adjust the rotation intervals and/or rotational position of the rotor. For example, the core turning controller 150 can predetermine the rotor positions and the time period during which to rotate the rotor based on a previous operating time of the gas turbine engine. Accordingly, the bowed rotor prevention system 100 can minimize energy use, while removing, or even preventing, bowed rotors that can occur in a gas turbine engine. In addition to energy conservation adjusting the rotational position of the rotor at targeted intervals (rather than continuously without stoppage) can prevent an excessive bow in a targeted direction. Having the bowed rotor prevention system 100 rotate the rotor to targeted positions over a given time interval rather than constantly rotating the rotor over full rotations during a given time interval prevents the rotor from inadvertently stopping in a similar location two or more times and allowing a bow to form.

In one or more non-limiting embodiments, the core turning controller 150 can turn the rotor to a targeted rotational position. Once the rotor is adjusted into the targeted position, the core turning controller 150 stores the current target position in memory, and halts further rotation for a set stoppage time e.g., 3 minutes. Once the stoppage time expires, the core turning controller 150 can again turn the rotor to another targeted rotational position, store the new target position in memory, and halt further rotation for a set time duration e.g., 3 minutes. As described herein, intermittently turning the rotor between stoppage times rather than continuously turning the rotor conserves power compared to conventional thermal bowing motoring system. In addition, by storing the targeted rotational positions in memory, the core turning controller 150 can compare a most recent adjusted position of the rotor to the previous rotor positions stored in memory. When the most recent adjusted position of the rotor matches, or substantially matches, a stored previous rotor position, the core turning controller 150 can re-adjust the rotor to a new position excluded from the stored previous rotor positions to ensure that the rotor does not stopped in the same position two or more times. In this manner, occurrence of a thermal bow in the rotor can be further prevented.

According to a non-limiting embodiment, the core turning controller 150 can determine a thermal temperature of the rotor (e.g., using a temperate sensor or infrared measuring waveguide) and control the motor 102 to periodically rotate the rotor into a plurality of rotor positions during a time period based on the thermal temperature. Based on the thermal temperature of the rotor, the core turning controller 150 can determine a plurality of rotor positions and/or the given time period during which to rotate the rotor, and control the motor 102 to intermittently adjust the rotor into the rotor position during the time period.

The backup rotor turning system 254 can be invoked and utilized when the core turning controller 150 detects one or more faults with the bowed rotor control system 100. The backup rotor turning system 254 is coupled to the air turbine starter assembly 60, along with a starter air valve 61, and can utilize control logic 256 to control the gas turbine engine 20 and the starter system 60. When, for example, the core turning controller 150 detects a fault with one or more of the rotation sensors 69, the clutch 78, and/or the gear system 62, a rotation fault as indicated by the rotor signal from the rotation sensor 69, etc., the core turning controller 150 can deactivate the bowed rotor control system 100 and activate the backup rotor turning system 254. In a non-limiting embodiment, the core turning controller 150 can disengage the clutch 78, which in turn disengages the core turning motor 102 to hand off rotor turning to the backup rotor turning system 254. Accordingly, the backup rotor turning system 254 turns the rotor at a constant rotation and fixed speed until the thermal bowing is removed. Once thermal bowing is removed, the air turbine starter assembly 60 and starter air valve 61 can be activated and operate together to convert pneumatic (air) energy to mechanical torque, which advances rotation of the gas turbine engine 20 until it reaches ignition speed.

Figure 4:
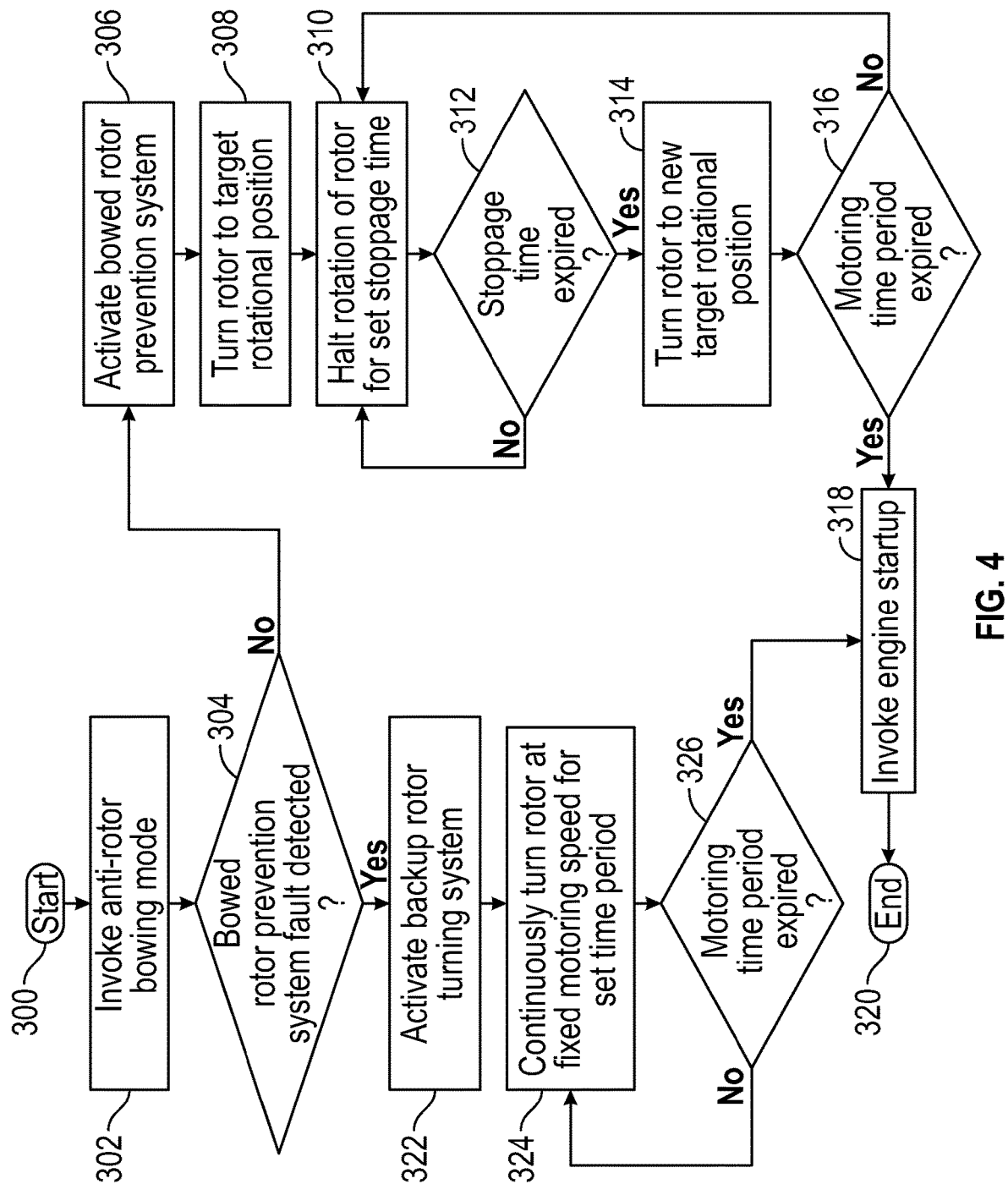
FIG. 4 is a flow diagram illustrating a method of removing and/or preventing thermal bowing in an aircraft rotor according to a non-limiting embodiment of the present disclosure.

Turning now to FIG. 4, a method of mitigating thermal bowing in an aircraft rotor is illustrated according to a non-limiting embodiment of the present disclosure. The method begins at operation 300, and an anti-rotor bowing mode is invoked at operation 302. At operation 304, a determination is made as to whether a fault exists in a bowed rotor prevention system configured to optimally remove or prevent thermal bowing of the rotor. When no fault exists, the bowed rotor prevention system is activated at operation 306 and turns the rotor to a target rotational position at operation 308. At operation 310, the bowed rotor prevention system halts the rotor at the target position for a set stoppage time. At operation 312, a determination is made as to whether the stoppage time has expired. When the stoppage time has not expired, the method returns to operation 310 and maintains the rotor, halted or stopped, at the target position.

When, however, the stoppage time expires, the method proceeds to operation 314 and turns the rotor to a new target rotational position. At operation 316, a determination is made as to whether a motoring time period has expired. That is, whether a pre-set amount of time at which to operate the anti-rotor bowing mode has expired. When the motoring time period has not expired, the method returns to operation 310. When, however, the motoring time has expired, engine start-up is invoked at operation 318, and the method ends at operation 320.

When a fault is detected at operation 304, the backup rotor turning system is activated at operation 322. Accordingly, the backup rotor turning system continuously turns the rotor at fixed motoring speed for set time period at operation 324. At operation 326, a determination is made as to whether the motoring time period has expired. When the motoring time period has not expired, the method returns to operation 324 and continues turning the rotor. When, however, the motoring time period expires, engine start-up is invoked at operation 318, and the method ends at operation 320.

As describe herein, a bowed rotor prevention system is provided according to one or more non-limiting embodiments of the present disclosure. According to various non-limiting embodiments, a bowed rotor prevention system is provided which is configured to optimally remove, or even fully prevent, rotor bow that can occur in a gas turbine engine. The bowed rotor prevention system implements one or more rotation sensors that can inform an engine control system of the current rotation and/or position of the rotor. In one or more embodiments, the bowed rotor prevention system utilizes the gear rotation data to set the rotor position at defined locations at set intervals rather than continually rotating the rotor over random and non-discretionary positions or time intervals. In this manner, the bowed rotor prevention system according to various embodiments of the present disclosure can minimize energy use, while removing, or even preventing, bowed rotors that can occur in a gas turbine engine.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bowed rotor prevention system comprises:
   a gas turbine engine including a rotor that is rotatably coupled to a drive shaft;
   an electric motor rotatably coupled to a motor shaft, the motor shaft mechanically coupled to the drive shaft so as to rotate therewith; and
   a core turning controller in signal communication with the electric motor, the core turning controller configured to invoke an anti-rotor bowing mode, and to control the electric motor to periodically rotate the rotor into a plurality of rotor positions during a given time period in response to invoking the anti-rotor bowing mode; and
   further comprising at least one rotation sensor configured to sense rotation of the rotor and output a rotational signal indicating one or both of a rotational rotor speed of the at least one rotor and a rotor position of the rotor, wherein the core turning controller utilizes the rotational signal to determine one or both of at least one previous rotor position of the rotor during the given time period and a current rotor position of the rotor during the given time period.

2. The bowed rotor prevention system of claim 1, wherein the core turning controller compares the current rotor position to the at least one previous rotor position, and determines at least one new rotor position based on the comparison.

3. The bowed rotor prevention system of claim 2, wherein the core turning controller adjusts the rotor from the current rotor position to the at least new rotor position in response to the current rotor position matching the at least one previous rotor position.

4. The bowed rotor prevention system of claim 1, wherein the co re turning controller pre-determines the plurality of rotor positions based on the given time period.

5. The bowed rotor prevention system of claim 4, wherein the core turning controller determines the given time period based on a previous operating time of the gas turbine engine.

6. The bowed rotor prevention system of claim 5, wherein the previous operating time is a most recent completed flight of an aircraft implementing the gas turbine engine.

7. The bowed rotor prevention system of claim 4, wherein the core turning controller determines a thermal temperature of the rotor and controls the electric motor to periodically rotate the rotor into a plurality of rotor positions during the given time period based on the thermal temperature.

8. The bowed rotor prevention system of claim 7, wherein the core turning controller determines one or both of the plurality of rotor positions and the given time period based on the thermal temperature.

9. The bowed rotor prevention system of claim 5, wherein the previous operating time is based on an operating time of the engine.

10. A method of at least one of removing and preventing thermal bowing in an aircraft rotor, the method comprising:
    rotating a rotor of a gas turbine engine in response to rotating a drive shaft coupled to the rotor;
    driving, via an electric motor, a motor shaft that is coupled to the drive shaft so as to rotate the drive shaft; and
    controlling, by a core turning controller, the electric motor to periodically rotate the rotor into a plurality of rotor positions during a given time period; and
    sensing rotation of the rotor using at least one rotation sensor: outputting from the at least one sensor a rotational signal indicating one or both of a rotational rotor speed of the at least one rotor and a rotor position of the rotor; and based on the rotational signal, determining by the core turning controller one or both of at least one previous rotor position of the rotor during the given time period and a current rotor position of the rotor during the given time period.

11. The method of claim 1, further comprising:
    comparing, by the core turning controller, the current rotor position to the at least one previous rotor position; and
    determining at least one new rotor position based on the comparison.

12. The method of claim 10, further comprising controlling the electric motor, by the core turning controller, so as to adjust the rotor from the current rotor position to the at least new rotor position in response to the current rotor position matching the at least one previous rotor position.

13. The method of claim 10, further comprising predetermining, by the core turning controller, the plurality of rotor positions based on the given time period.

14. The method of claim 12, further comprising determining, by the core turning controller, the given time period based on a previous operating time of the gas turbine engine.

15. The method of claim 13, wherein the previous operating time is a most recent completed flight of an aircraft implementing the gas turbine engine.

16. The method of claim 12, further comprising:
   determining, by the core turning controller, a thermal temperature of the rotor; and
   controlling the electric motor to periodically rotate the rotor into a plurality of rotor positions during the given time period based on the thermal temperature.

17. The method of claim 15, further comprising determining, by the core turning controller, one or both of the plurality of rotor positions and the given time period based on the thermal temperature.

18. The method of claim 13, wherein the previous operating time is based on an operating time of the engine.

* * * * *